US011747870B2

(12) United States Patent
    Xu

(10) Patent No.: US 11,747,870 B2
(45) Date of Patent: Sep. 5, 2023

(54) DISPLAY MODULE AND DISPLAY PANEL HAVING THE SAME

(71) Applicants: HEFEI BOE VISION-ELECTRONIC TECHNOLOGY CO., LTD., Anhui (CN); BOE TECHNOLOGY GROUP CO., LTD., Beijing (CN)

(72) Inventor: Lushan Xu, Beijing (CN)

(73) Assignees: HEFEI BOE VISION-ELECTRONIC TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/185,227

(22) Filed: Feb. 25, 2021

(65) Prior Publication Data
    US 2021/0271297 A1     Sep. 2, 2021

(30) Foreign Application Priority Data
    Feb. 27, 2020    (CN) .......................... 202010124615.0

(51) Int. Cl.
    *G06F 1/16*    (2006.01)
    *G06F 1/18*    (2006.01)
(52) U.S. Cl.
    CPC ............ *G06F 1/181* (2013.01); *G06F 1/1603* (2013.01)
(58) Field of Classification Search
    CPC ...... G06F 1/181; G06F 1/1603; G06F 1/1601; G02F 1/133314; G02F 1/133317; G02F 1/13332; G02F 1/133512; G09F 9/00
    See application file for complete search history.

(56) References Cited

U.S. PATENT DOCUMENTS

| 2007/0200969 A1* | 8/2007 | Hsu ...................... | G02B 6/0088 349/58 |
| 2011/0157519 A1* | 6/2011 | Yusa .................... | G02B 6/0088 349/64 |

(Continued)

FOREIGN PATENT DOCUMENTS

| CN | 102736285 A | 10/2012 |
| CN | 102889523 A | 1/2013 |

(Continued)

OTHER PUBLICATIONS

First Office Action for Chinese Application No. 202010124615.0, dated May 21, 2021, 7 Pages.

*Primary Examiner* — Rockshana D Chowdhury
(74) *Attorney, Agent, or Firm* — BROOKS KUSHMAN P.C.

(57) ABSTRACT

The present disclosure provides a backlight module and a display panel including the backlight module. The backlight module includes a back plate, a front housing and a membrane structure. The front housing is arranged in front of the back plate and coupled to the back plate. The membrane structure is arranged between the back plate and the front housing. A light-shielding structure is placed on at least one of the back plate and the front housing, the light-shielding structure on one of the back plate and the front housing abuts against the other one of the back plate and the front housing, and each light-shielding structure is arranged at a side of the membrane structure distal to a central axis of the backlight module, so as to shield light emitted by the membrane structure in a direction away from the central axis of the backlight module.

18 Claims, 8 Drawing Sheets

(56) References Cited

U.S. PATENT DOCUMENTS

| | | | |
|---|---|---|---|
| 2013/0242226 A1* | 9/2013 | Jeong | G02F 1/133512 |
| | | | 445/24 |
| 2015/0301272 A1* | 10/2015 | Chang | G02B 6/005 |
| | | | 362/606 |
| 2017/0045774 A1* | 2/2017 | Yoshikawa | G02F 1/133512 |
| 2017/0146724 A1* | 5/2017 | Zhou | G02B 6/005 |
| 2020/0042043 A1* | 2/2020 | Lee | G06F 1/1643 |
| 2020/0081482 A1* | 3/2020 | Huang | G06F 1/1601 |
| 2021/0096593 A1* | 4/2021 | Hao | G06F 1/181 |
| 2021/0168948 A1* | 6/2021 | Tu | B32B 3/30 |

FOREIGN PATENT DOCUMENTS

| | | |
|---|---|---|
| CN | 203596868 U | 5/2014 |
| CN | 104595812 A | 5/2015 |
| CN | 206863404 U | 1/2018 |

\* cited by examiner

DISPLAY MODULE AND DISPLAY PANEL HAVING THE SAME

CROSS-REFERENCE TO RELATED APPLICATION

The present application claims a priority of the Chinese patent application No. 202010124615.0 filed on Feb. 27, 2020, which is incorporated herein by reference in its entirety.

TECHNICAL FIELD

The present disclosure relates to the field of display device, in particular to a backlight module and a display panel including the backlight module.

BACKGROUND

Middle-frame-free structural design has been proposed to provide an exquisite TV product. However, in the related art, due to the absence of a middle frame, there is a rearview light leakage for the entire TV, especially at night or in dark room, thereby a visual defect may bring about adverse effect on a user.

SUMMARY

In a first aspect, the present disclosure provides in some embodiments a backlight module, including: a back plate; a front housing arranged in front of the back plate and coupled to the back plate; and a membrane structure arranged between the back plate and the front housing. A light-shielding structure is placed on at least one of the back plate and the front housing, the light-shielding structure is arranged between the back plate and the front housing.

In some possible embodiments of the present disclosure, the light-shielding structure includes one or more light-shielding ribs.

In some possible embodiments of the present disclosure, an edge of the front housing includes a plurality of secondary edges, and each light-shielding rib corresponds to one secondary edge and extends in an extension direction of the corresponding secondary edge.

In some possible embodiments of the present disclosure, the light-shielding structure is arranged at a side of the front housing facing the back plate.

In some possible embodiments of the present disclosure, the light-shielding structure is arranged at a side of the back plate facing the front housing.

In some possible embodiments of the present disclosure, the light-shielding structures are arranged a side of the front housing facing the back plate and a side of the back plate facing the front housing.

In some possible embodiments of the present disclosure, the front housing includes: a first body portion with an annular structure, the light-shielding structure being arranged at a side of the first body portion facing the back plate; and a first peripheral portion arranged at a side of the light-shielding structure distal to a central axis of the backlight module. The first peripheral portion extends from an edge of the first body portion toward the back plate in a direction perpendicular to a surface of the front housing, and the first peripheral portion is coupled to the back plate through first clamping assemblies.

In some possible embodiments of the present disclosure, each first clamping assembly includes: a slot formed in the back plate; and a buckle arranged at a side of the first peripheral portion proximate to the central axis and protruding from an inner surface of the first peripheral portion. The buckle is clamped into the slot and abuts against an edge of the slot proximate to the front housing.

In some possible embodiments of the present disclosure, abutting ribs are arranged at a side of the light-shielding structure facing the first peripheral portion, the back plate includes a second body portion and a second peripheral portion, the second body portion is arranged opposite to the first body portion in a front-to-rear direction, the second peripheral portion extends from an edge of the second body portion toward the front housing in the direction perpendicular to the surface of the front housing, and the second peripheral portion is arranged between each abutting rib and the first peripheral portion in such a manner that the second peripheral portion is coupled to the first peripheral portion through the first clamping assembly and abuts against the abutting rib.

In some possible embodiments of the present disclosure, the abutting ribs and the first clamping assemblies are arranged alternately in an extension direction of the light-shielding structure.

In some possible embodiments of the present disclosure, a rubber block is arranged between the back plate and the front housing, at a corner of the back plate and at a side of the membrane structure, and the rubber block is arranged in such a manner as to avoid the light-shielding structure.

In some possible embodiments of the present disclosure, the rubber block is coupled to the back plate through second clamping assemblies.

In some possible embodiments of the present disclosure, the rubber block includes: a first connection member extending in a first edge of the back plate and coupled to the back plate through a corresponding second clamping assembly; and a second connection member extending in a second edge of the back plate and coupled to the back plate through a corresponding second clamping assembly. The second edge is arranged adjacent to the first edge.

In some possible embodiments of the present disclosure, the membrane structure includes: an over coating (OC) layer arranged between the front housing and the rubber block and fitted on the rubber block; and a membrane arranged between the OC layer and the back plate, and fitted on the front housing.

In some possible embodiments of the present disclosure, an outer contour of the front housing is of a quadrilateral shape, there is a plurality of light-shielding structures arranged at an upper side, a left side and a right side of the front housing respectively, and a back housing is arranged in back of the back plate and at least shields a lower edge of the front housing.

In some possible embodiments of the present disclosure, an outer contour of the front housing is of a quadrilateral shape, there is a plurality of light-shielding structures arranged at an upper side, a lower side, a left side and a right side of the front housing respectively.

In some possible embodiments of the present disclosure, an edge of the front housing includes four secondary edges, there are three light-shielding ribs corresponding to three of the four secondary edges respectively, and each light-shielding rib extends in an extension direction of the corresponding secondary edge.

In some possible embodiments of the present disclosure, the rubber block abuts against the back plate and the front housing.

In some possible embodiments of the present disclosure, the light-shielding rib is provided with a uniform cross section in a rectangular shape.

In a second aspect, the present disclosure provides in some embodiments a display panel including the above-mentioned backlight module.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

Figure 1:
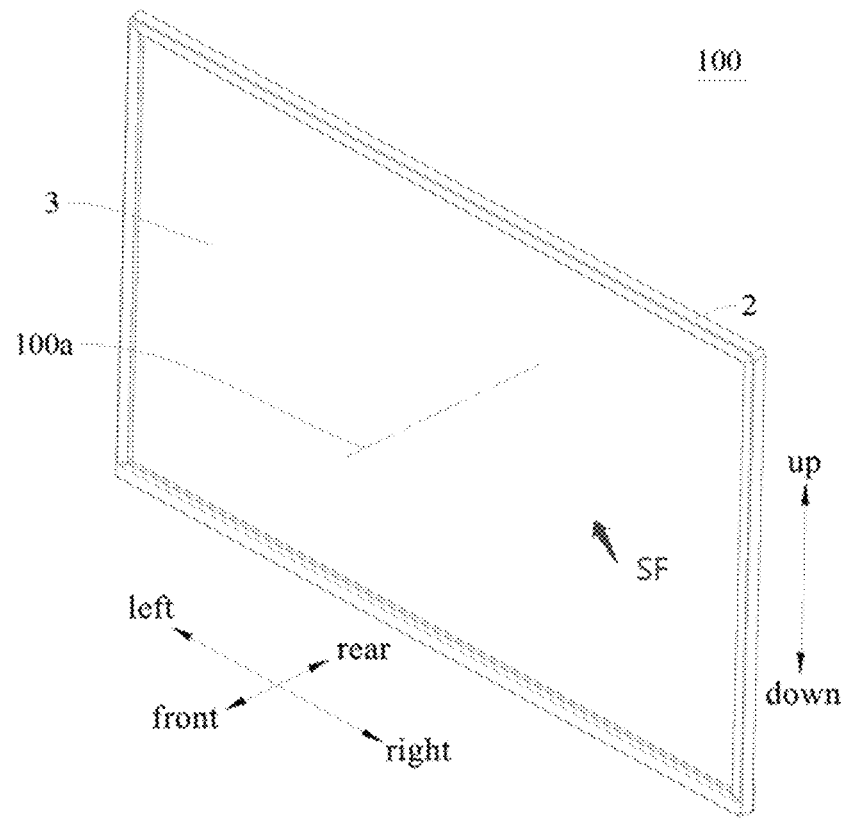
FIG. 1 is a schematic view showing a backlight module according to one embodiment of the present disclosure.

REFERENCE SIGN LIST 100 backlight module
100a central axis
1 back plate
11 second body portion
12 second peripheral portion
121 first edge
122 second edge
2 front housing
20 secondary edge
21 first body portion
211 installation protrusion
22 first peripheral portion
3 membrane structure
31 OC layer
32 membrane
320 installation hole
4 light-shielding structure
40 light-shielding rib
41 avoidance member 41
5 rubber block
51 first connection member
52 second connection member
6 rear housing
7 first clamping assembly
71 slot
72 buckle
8 second clamping assembly
81 hole
82 protrusion
9 abutting rib
SF surface of front housing

DETAILED DESCRIPTION

The present disclosure will be described hereinafter in conjunction with the drawings and embodiments. Identical or similar reference numbers in the drawings represent an identical or similar element or elements having an identical or similar function. The following embodiments are for illustrative purposes only, but shall not be used to limit the scope of the present disclosure.

Different embodiments or examples provided hereinafter are used to implement different structures. For ease of understanding, components and arrangement in special examples will be described hereinafter. Of course, they are provided for illustrative purposes only, but shall not be used to limit the present disclosure. In addition, for clarification, a same reference numeral and/or letter may be used in different examples, but it shall not be used to indicate any relationship between the embodiments and/or arrangements. In addition, various examples about specific processes and materials are provided hereinafter, but it should be appreciated that, any other appropriate processes and/or materials may also be used.

The present disclosure provides in some embodiments a backlight module 100, which may be a middle-frame-free backlight module, including a middle-frame-free, bezel-free lamination-type machine.

Figure 2:
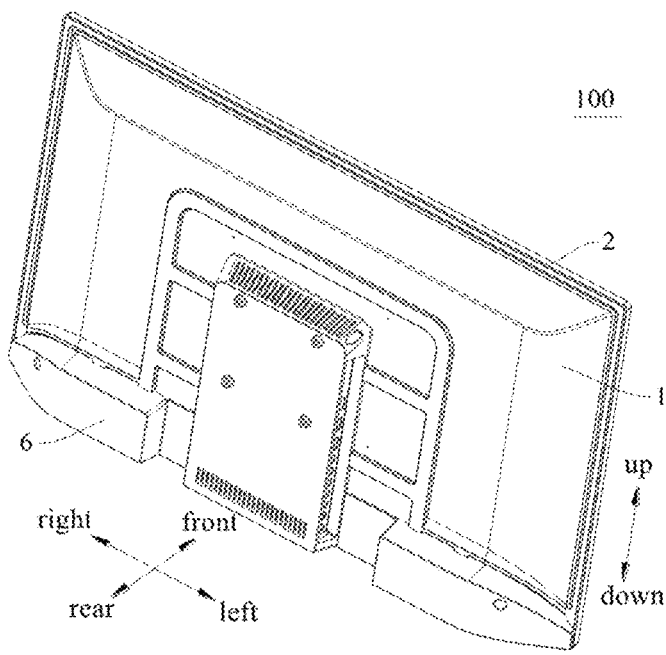
FIG. 2 is another schematic view showing the backlight module according to one embodiment of the present disclosure.
Figure 3:
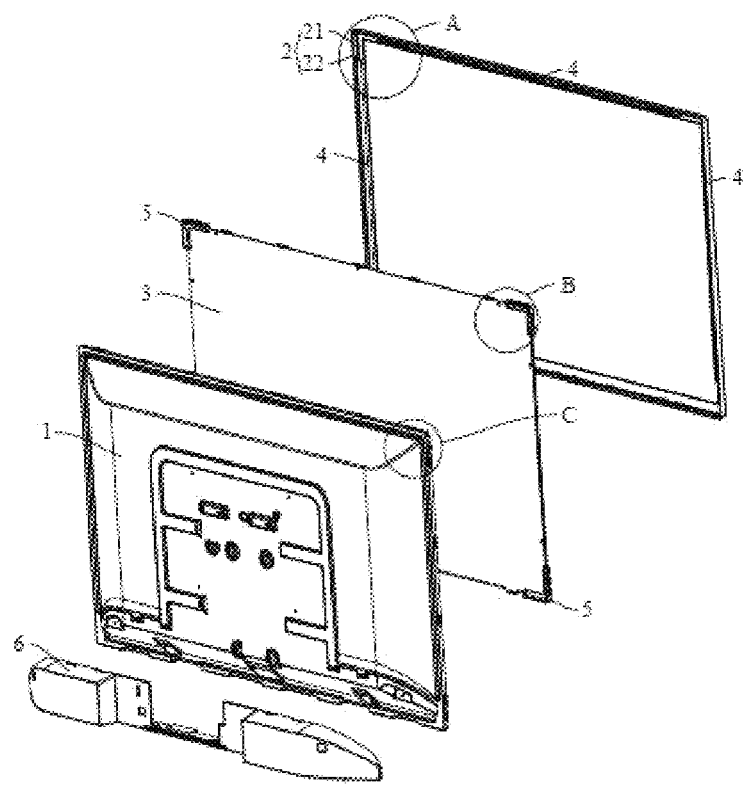
FIG. 3 is an exploded view of the backlight module according to one embodiment of the present disclosure.

As shown in FIGS. 1 to 3, the backlight module 100 includes a back plate 1, a front housing 2 and a membrane structure 3.

Figure 4:
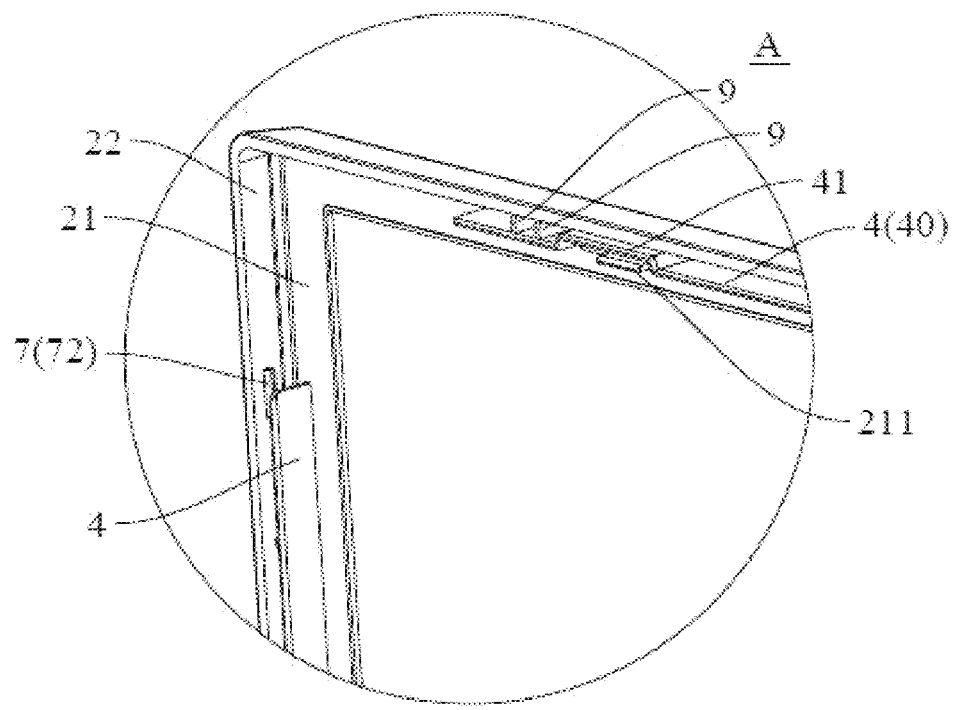
FIG. 4 is an enlarged view of part A in circle shown in FIG. 3.

As shown in FIGS. 3 and 4, the back plate 1 may be arranged opposite to the front housing 2 in a front-to-rear direction. The front housing 2 may be arranged in front of the back plate 1 and coupled to the back plate 1, and the membrane structure 3 may be arranged between the back plate 1 and the front housing 2. A light-shielding structure 4 may be placed on at least one of the back plate 1 and the front housing 2, i.e., (i) the light-shielding structure 4 may be placed on the back plate 1 rather than the front housing 2; (ii) the light-shielding structure 4 may be placed on the front housing 2 rather than the back plate 1; and (iii) the light-shielding structure 4 may be placed on each of the back plate 1 and the front housing 2.

It should be appreciated that, when the light-shielding structure 4 is placed on at least one of the back plate 1 and the front housing 2, it may be a part of the at least one of the back plate 1 and the front housing 2, rather than an independent structure. For example, when the light-shielding structure 4 is arranged on the back plate 1, it may be a part of the back plate 1, rather than a structure arranged independent of the back plate 1. Identically, when the light-shielding structure 4 is arranged on the front housing 2, it may be a part of the front housing 2, rather than a structure arranged independent of the front housing 2. Hence, it is unnecessary to provide the backlight module 100 with any additional, independent member, thereby to reduce the manufacture cost.

The light-shielding structure 4 on one of the back plate 1 and the front housing 2 may abut against the other one of the back plate 1 and the front housing 2, and the light-shielding structure 4 may be arranged outside an edge of the membrane structure 3, i.e., at a side of the membrane structure 3 distal to a central axis 100a of the backlight module 100 (i.e., in a radially outward direction of the central axis 100a), so as to shield light emitted by the membrane structure 3 in a direction away from the central axis 100a of the backlight module 100, thereby to prevent the occurrence of such a problem as rearview light leakage for the entire backlight module 100 when the light emitted by the membrane structure 3 passes through a gap between the back plate 1 and the front housing 2. Herein, the central axis 100a refers to an axis at a central part of a surface of the back plate 1 or the front housing 2 and perpendicular to the surface of the back plate 1 or the front housing 2. In other words, the light-shielding structure 4 may be used to prevent the light emitted by the membrane structure 3 from being leaked out of the backlight module 100, so as to effectively prevent the light leakage for the backlight module 100. In addition, it is unnecessary to provide any additional member for the backlight module 100, thereby to reduce the manufacture cost and facilitate the manufacture. Moreover, because the light-shielding structure 4 on one of the back plate 1 and the front housing 2 may abut against the other one of the back plate 1 and the front housing 2, the light-shielding structure 4 may support the back plate 1 and the front housing 2 to some extent, so as to provide the back plate 1 and the front housing 2 with a stable structure, and prevent the front housing 2 from pressing against the membrane structure 3 and thereby prevent the occurrence of the light leakage for the membrane structure 3 when the front housing is depressed toward the back plate 1, thereby to ensure the reliability of the membrane structure 3, and improve the structural stability of the backlight module 100.

When the light-shielding structure 4 on one of the back plate 1 and the front housing 2 abuts against the other one of the back plate 1 and the front housing 2, there may exist the following three circumstances: (i) When the light-shielding structure 4 is placed on the back plate 1, it may abut against the front housing 2; (ii) When the light-shielding structure 4 is placed on the front housing 2, it may abut against the back plate 1; and (iii) When the light-shielding structure 4 is placed on each of the back plate 1 and the front housing 2, the light-shielding structure 4 on the back plate 1 may abut against the light-shielding structure 4 on the front housing 2 or abut against a portion of the front housing 2 other than the light-shielding structure 4, and identically, the light-shielding structure 4 on the front housing 2 may abut against the light-shielding structure 4 on the back plate 1 or abut against a portion of the back plate 1 other than the light-shielding structure 4.

In the front-to-rear direction, the word "front" refers to a side of the backlight module 100 facing a user in use, and the word "rear" refers to a side of the backlight module 100 away from the user. In addition, the central axis 100a of the backlight module 100 may extend in the front-to-rear direction.

Hence, when the light-shielding structure 4 is placed on at least one of the back plate 1 and the front housing 2, the light-shielding structure 4 on one of the back plate 1 and the front housing 2 abuts against the other one of the back plate 1 and the front housing 2, and the light-shielding structure 4 is arranged at a side of the membrane structure 3 distal to the central axis 100a, it is able to effectively prevent the light emitted by the membrane structure 3 from passing through the gap between the back plate 1 and the front housing 2. In addition, the backlight module 100 may be manufactured easily at a low manufacture cost due to a simple structure, and have excellent practical applicability, so it is able to improve the product competitiveness. In contrast, in the related art where a large quantity of light-shielding adhesive tapes are adhered inside the front housing 2, the arrangement of the light-shielding adhesive tapes is relatively complicated, and it is impossible to prevent the occurrence of rearview light leakage due to an imperfect light-shielding effect. However, in the embodiments of the present disclosure, the light-shielding structure 4 may be placed on at least one of the back plate 1 and the front housing 2 to shield the light emitted by the membrane structure 3 and prevent the occurrence of light leakage. In addition, it is unnecessary to provide any additional member, let alone the installation of the additional member as well as the assembling of the additional member with the member of the backlight module 100, thereby to facilitate the processing and assembling of the backlight module 100. In addition, the light-shielding structure 4 may serve as a support to some extent, so it is able to improve the structural stability of the backlight module 100.

In some embodiments of the present disclosure, as shown in FIG. 4, the light-shielding structure 4 may include one or more light-shielding ribs 4. In addition, an edge of the front housing 2 may include a plurality of secondary edges 20 corresponding to the light-shielding ribs 40 respectively. Each light-shielding rib 40 may extend in an extension direction of the corresponding secondary edge 20. The light-shielding rib 40 may be of an elongated structure, e.g., a straight-line or curved-line elongated structure, so as to simplify the structure of the light-shielding structure 4, thereby to reduce the manufacture cost. In addition, when the light-shielding rib 40 extends in the extension direction of the corresponding secondary edge 20, there may exist the following circumstances: (i) An extension direction of each light-shielding rib 40 may be substantially parallel to the extension direction of the corresponding secondary edge 20; and (ii) There may exist a small angle between the extension direction of each light-shielding rib 40 and the extension direction of the corresponding secondary edge 20, so as to provide the light-shielding rib 40 with a sufficient length, thereby to enable the light-shielding structure 4 to effectively shield substantially all the light emitted by the membrane structure 3 toward the outside.

It should be appreciated that, the quantity of light-shielding ribs 40 may be smaller than or equal to the quantity of the secondary edges 20 of the front housing 2. For example, in FIG. 10, the edge of the front housing 2 includes four secondary edges 20, there are three light-shielding ribs 40 corresponding to three of the four secondary edges 20 respectively, and each light-shielding rib 40 may extend in the extension direction of the corresponding secondary edge 20.

A length and a cross-sectional shape of the light-shielding rib 40 may be set according to the practical need. For example, as shown in FIG. 4, the light-shielding rib 40 may be of a uniform cross section in a rectangular shape, with a length direction of the rectangular shape being parallel to the front-to-rear direction. In this regard, it is able to simplify the structure of the light-shielding rib 40 and reduce the material consumption while ensuring a support capability of the light-shielding rib 40.

In some embodiments of the present disclosure, as shown in FIG. 4, the light-shielding structure 4 may be arranged at a side of the front housing 2 facing the back plate 1. In other words, the light-shielding structure 4 may not be placed on the back plate 1, and instead, it may be placed at a back side of the front housing 2 and extend backward to abut against the back plate 1. In this regard, the light-shielding structure 4 may be arranged in a simple manner, so as to facilitate the processing.

It should be appreciated that, when the light-shielding structure 4 is not placed on the front housing 2, it may be placed at a front side of the back plate 1 and extend forward to abut against the front housing 2.

Figure 8:
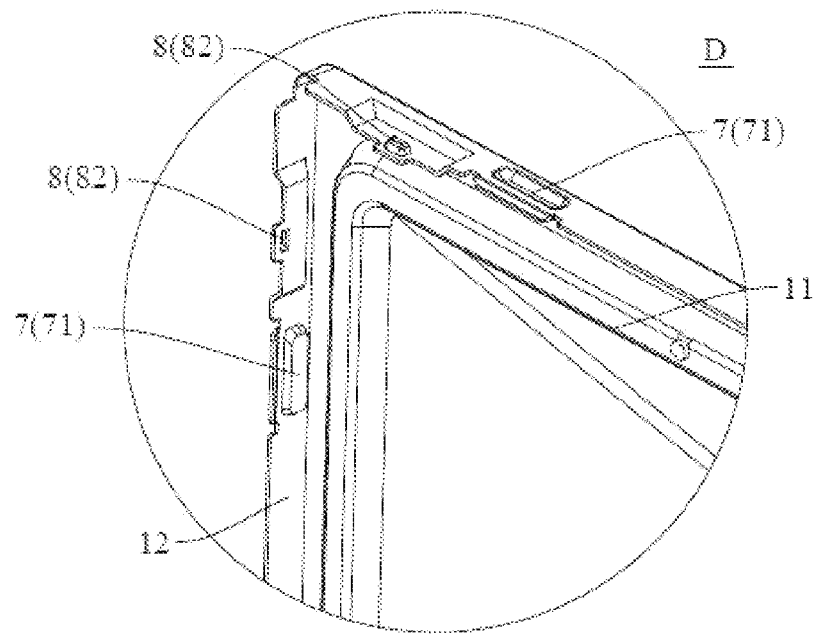
FIG. 8 is an enlarged view of part D in circle shown in FIG. 7.

In some embodiments of the present disclosure, as shown in FIGS. 4 and 8, the front housing 2 may include a first body portion 21 and a first peripheral portion 22. The first body portion 21 may be of an annular structure, and the light-shielding structure 4 may be arranged at a side of the first body portion 21 facing the back plate 1 and extend backward. The first peripheral portion 22 may be arranged at a side of the light-shielding structure 4 away from the central axis 100*a* (i.e., in the radially outward direction of the central axis 100*a*), and it may extend from an edge of the first body portion 21 toward the back plate 1 in a direction perpendicular to a surface SF of the front housing 2 (for example, a surface of the first body portion). Herein the surface SF of the front housing 2 is shown in FIG. 1 as an example, which represents the front surface of the front housing 2. The first peripheral portion 22 may be coupled to the back plate 1 through first clamping assemblies 7. In this regard, it is able to simplify the structure of the front housing 2, and provide sufficient room for the membrane structure 3 and the light-shielding structure 4.

For example, as shown in FIG. 4, the first body portion 21 may be of a rectangular annular structure. The light-shielding structure 4 may be arranged at a rear side of the first body portion 21, and a rear end of the light-shielding structure 4 may abut against the back plate 1. The first peripheral portion 22 may extend backward from the edge of the first body portion 21. In this regard, it is able to facilitate the connection between the front housing 2 and the back plate 1, and ensure the assembling efficiency of the backlight module 100.

For example, as shown in FIGS. 4 and 8, the first clamping assembly 7 may include a slot 71 and a buckle 72. The slot 71 may be formed in the back plate 1. The buckle 72 may be arranged at a side of the first peripheral portion 22 proximate to the central axis 100*a* (i.e., in a radially inward direction of the central axis 100*a*), and protrude from an inner surface of the first peripheral portion 22. The buckle 72 may be clamped into the slot 71 and abut against an edge of the slot 71 proximate to the front housing 2, so as to enable the buckle 72 to be in reliable engagement with the slot 71, thereby to ensure the connection reliability of the first clamping assembly 7.

It should be appreciated that, the front housing 2 may be detachably coupled to the back plate 1 through the first clamping assembly 7, so as to facilitate the assembling and disassembling of the backlight module 100, thereby to improve the assembling efficiency and facilitate the maintenance.

In some embodiments of the present disclosure, as shown in FIGS. 4 and 8, abutting ribs 9 may be arranged at a side of the light-shielding structure 4 facing the first peripheral portion 22, and protrude from an outer surface of the light-shielding structure 4. The back plate 1 may include a second body portion 11 and a second peripheral portion 12. The second body portion 11 may be arranged opposite to the first body portion 21 in a front-to-rear direction, and extend from an edge of the second body portion 11 toward the front housing 2 in the direction perpendicular to the surface of the front housing 2 (e.g., in FIG. 8, the second peripheral portion 12 may extend forward from the edge of the second body portion 11). The second peripheral portion 12 may be arranged between each abutting rib 9 and the first peripheral portion 22 in such a manner that the second peripheral portion 12 is coupled to the first peripheral portion 22 through the first clamping assembly 7 and abuts against the abutting rib 9, so as to enable the abutting rib 9 to abut against an inner surface of the second peripheral portion 12. In this regard, when assembling the back plate 1 and the front housing 2, the second peripheral portion 12 may be deeply inserted between the abutting rib 9 and the first peripheral portion 22. Due to the effect of the first clamping assembly 7, a force may be applied by the first peripheral portion 22 to the second peripheral portion 12 inwardly, so as to enable the second peripheral portion 12 to be depressed and deformed inwardly. After the buckle has been clamped into the slot, due to the existence of the abutting rib 9, it is able to reduce the deformation of the second peripheral portion 12, thereby to ensure the firm connection of the first clamping assembly 7 and improve the reliability of the entire backlight module 100.

As compared with the related art where a sheet-like tongue is arranged at an inner side of the front housing, the abutting rib 9 in the embodiments of the present disclosure may not be broken easily and thereby have excellent operational reliability during the assembling and disassembling of the backlight module 100, so it is able to prevent the front housing 1 from being discarded due to the broken abutting rib 9.

Figure 11:
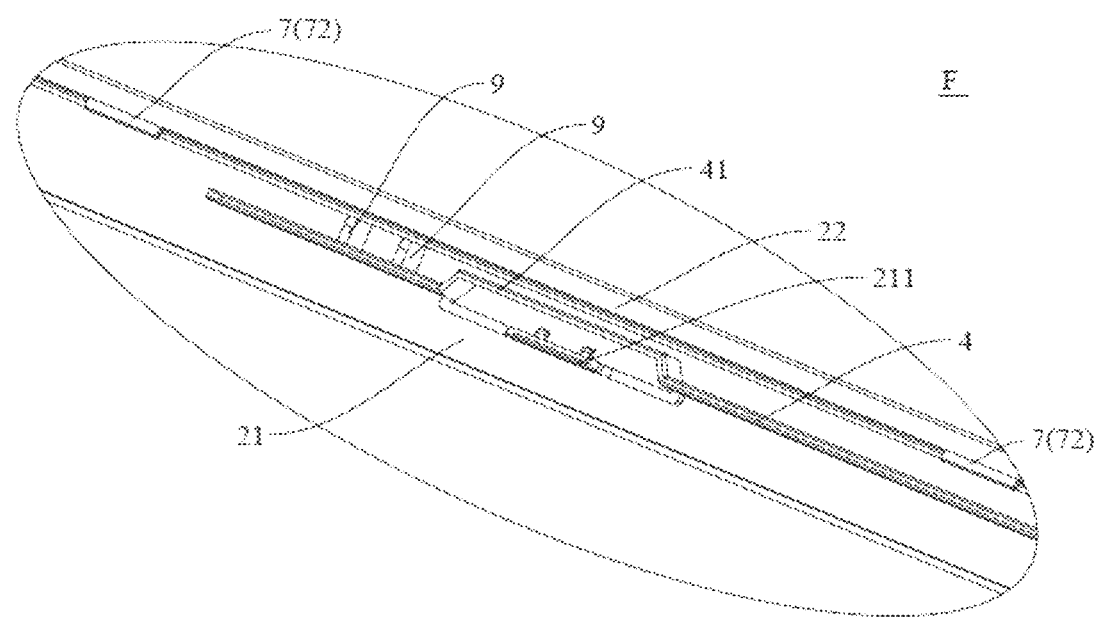
FIG. 11 is an enlarged view of part F in circle shown in FIG. 10.

In some embodiments of the present disclosure, as shown in FIG. 11, in the extension direction of the light-shielding structure 4, the abutting ribs 9 and the first clamping assemblies 7 may be arranged alternately, so as to enable the abutting ribs 9 and the first clamping assemblies 7 to be arranged in a staggered manner in the extension direction of the light-shielding structure 4, and prevent the first clamping assembly 7 from being adversely affected due to the abutting rib 9, thereby to prevent the abutting rib 9 from interfering the first clamping assembly and ensure the assembling feasibility of the first clamping assembly 7.

Figure 7:
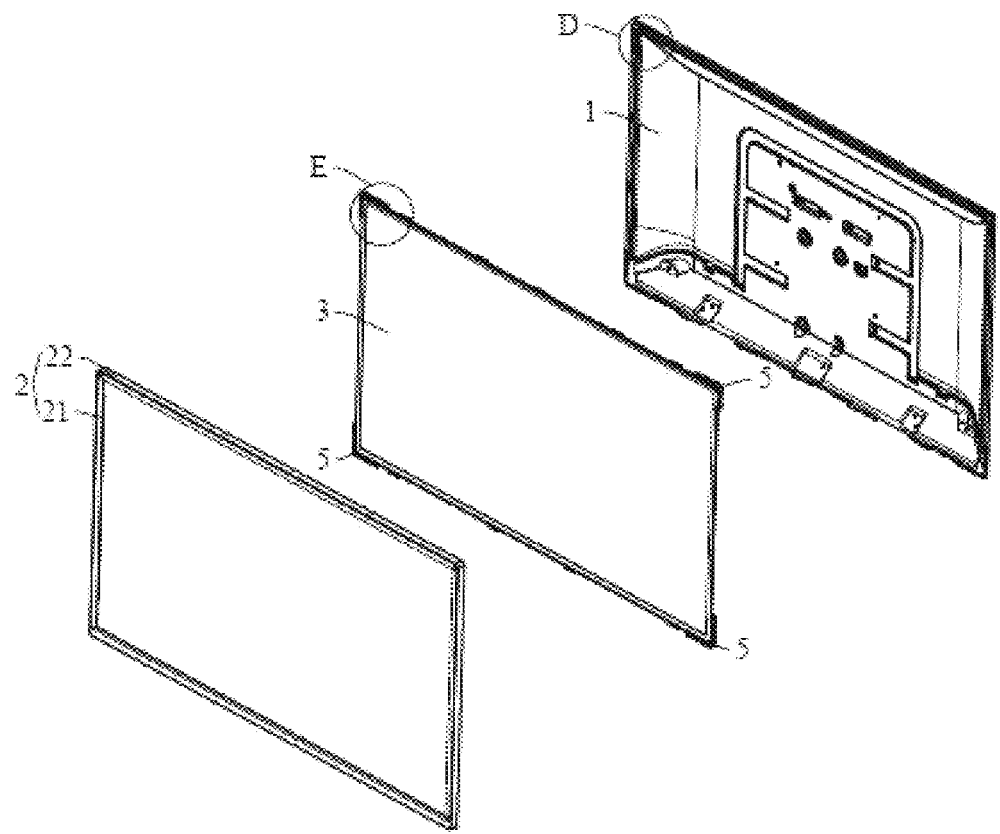
FIG. 7 is another exploded view of the backlight module according to one embodiment of the present disclosure.
Figure 12:
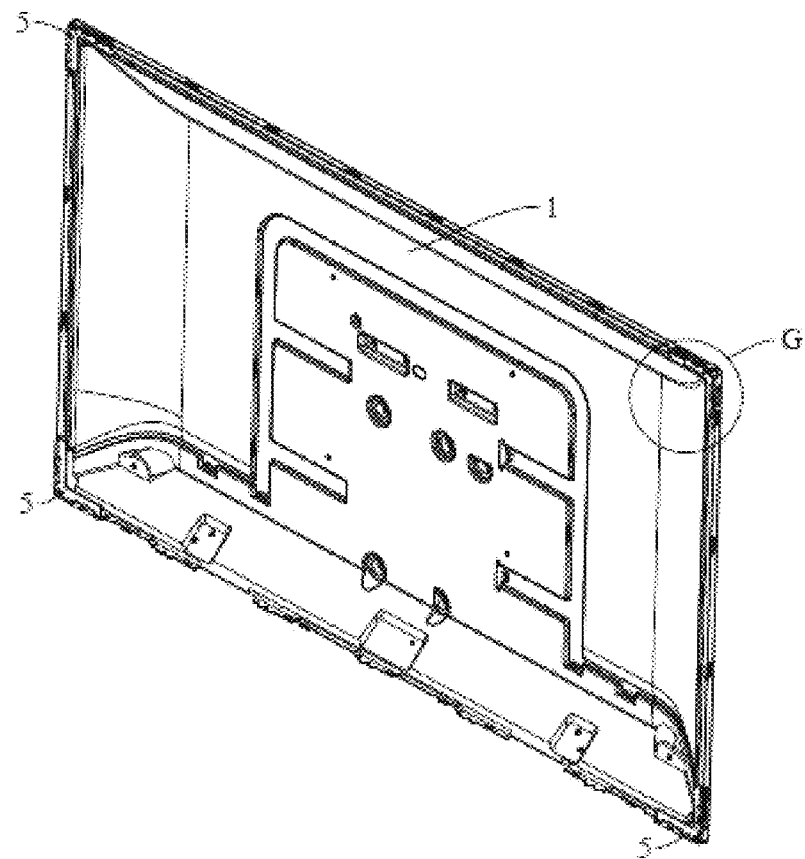
FIG. 12 is a schematic view showing the assembling of a back plate and a rubber block in FIG. 3.
Figure 15:
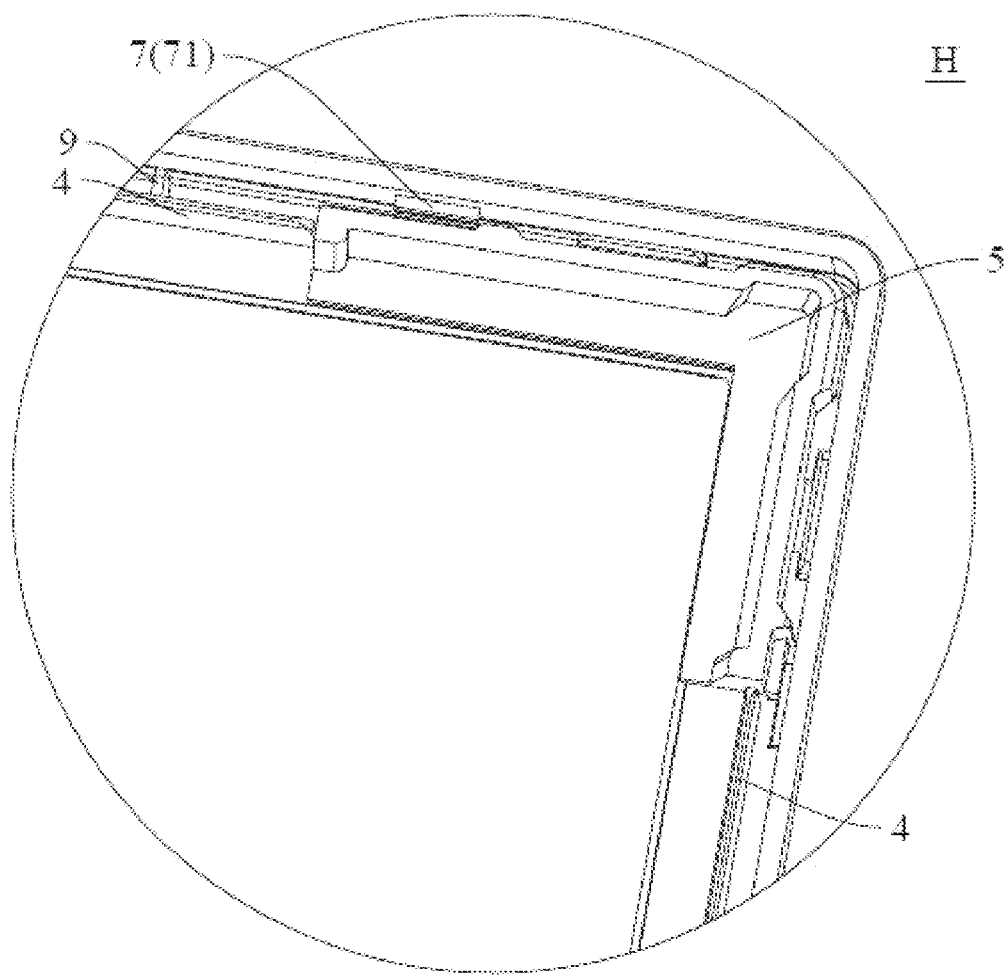
FIG. 15 is an enlarged view of part H in circle shown in FIG. 14.

In some embodiments of the present disclosure, as shown in FIGS. 7 and 12, a rubber block 5 may be arranged between the back plate 1 and the front housing 2, arranged at a corner of the back plate 1, and arranged at a side of the membrane structure 3. The rubber block 5 may protect the membrane structure 3 to some extent, so as to prevent the membrane structure 3 from being damaged when the backlight module 100 falls accidently with its corner landed firstly during the transportation and use. The rubber block 5 may be arranged in such a manner as to avoid the light-shielding structure 4, so as to prevent the rubber block 5 from interfering the light-shielding structure 4, and reduce a thickness of the backlight module 100. For example, in FIG. 15, the light-shielding structure 4 may extend along an edge of the backlight module 100, and may finally abut against the rubber block 5, or may be separated from the rubber block 5.

The term "corner" may be understood as a portion where one edge of the back plate 1 is coupled to another edge of the back plate 1.

In a possible embodiment of the present disclosure, when the rubber block 5 abuts against the back plate 1 and the front housing 2, it may also function as to shield the light emitted by the membrane structure 3 to some extent, so as to shield all the light emitted by the membrane structure 3 toward the outside.

Figure 13:
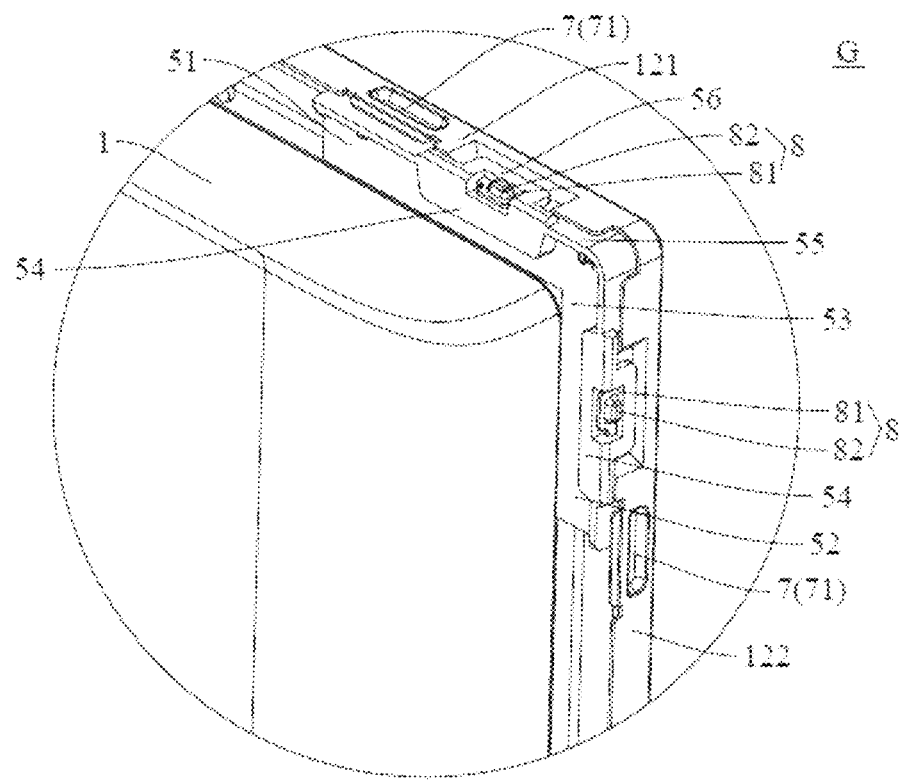
FIG. 13 is an enlarged view of part G in circle shown in FIG. 12.

In some embodiments of the present disclosure, as shown in FIG. 13, the rubber block 5 may be coupled to the back plate 1 through second clamping assemblies 8, so as to facilitate the installation of the rubber block 5. For example, in FIG. 13, the second clamping assembly 8 may include a hole 81 and a protrusion 82. The hole 81 may be formed in the rubber block 5, and the protrusion 82 may be arranged on the back plate 1 (e.g., the protrusion 82 may be arranged outside the second peripheral portion 12 of the back plate 1 and protrude from an outer surface of the second peripheral portion 12). The protrusion 82 may be clamped into the hole 81 and abut against a rear edge of the hole 81, so as to enable the protrusion 82 to be in reliable engagement with the hole 81. The term "outside" refers to a direction away from the central axis 100a of the backlight module 100, and an opposite direction may be defined as "inside".

As shown in FIG. 13, the rubber block 5 may include a body portion 55 and a folded portion 56. A front end of the folded portion 56 may be coupled to the body portion 55, and a rear end of the folded portion 56 may be separated from the body portion 55, so as to define a groove between the folded portion 56 and the body portion 55. The hole 81 may be formed in the folded portion 56, and the protrusion 82 may be arranged on the second peripheral portion 12 of the back plate 1. The second peripheral portion 12 may cooperate with the groove, so as to enable the protrusion 82 to be in engagement with the hole 81.

As shown in FIG. 13, the rubber block 5 may include a first connection member 51 and a second connection member 52. The first connection member 51 may extend along a first edge 121 of the back plate 1 and may be coupled to the back plate 1 through the second clamping assembly 8. The second connection member 52 may extend along a second edge 122 of the back plate 1 and may be coupled to the back plate 1 through the second clamping assembly 8. The second edge 122 may be arranged adjacent to the first edge 121. In this regard, it is able to ensure the installation reliability of the rubber block 5, thereby to prevent the occurrence of mismatching for the rubber block 5.

Figure 5:
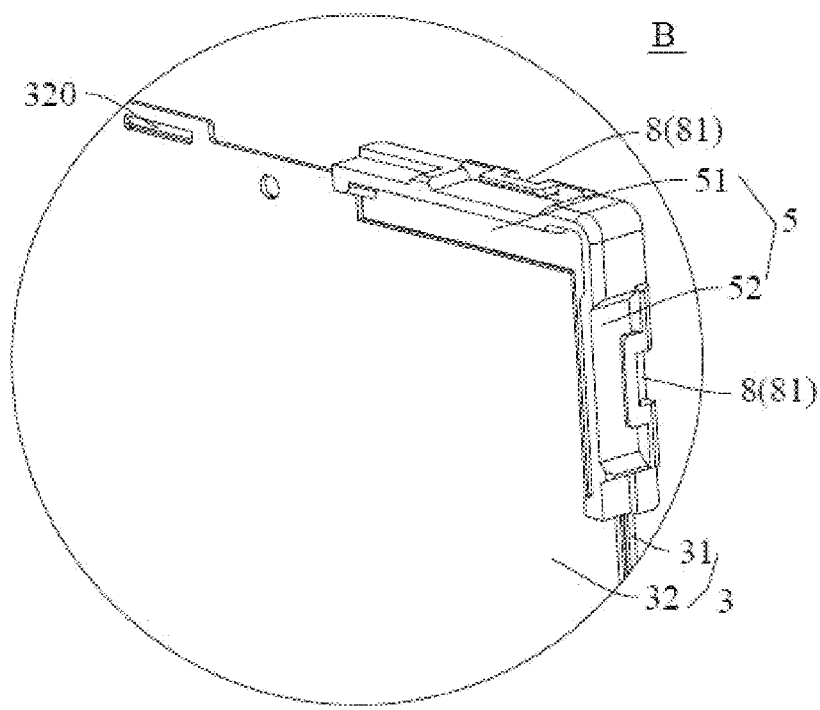
FIG. 5 is an enlarged view of part B in circle shown in FIG. 3.
Figure 6:
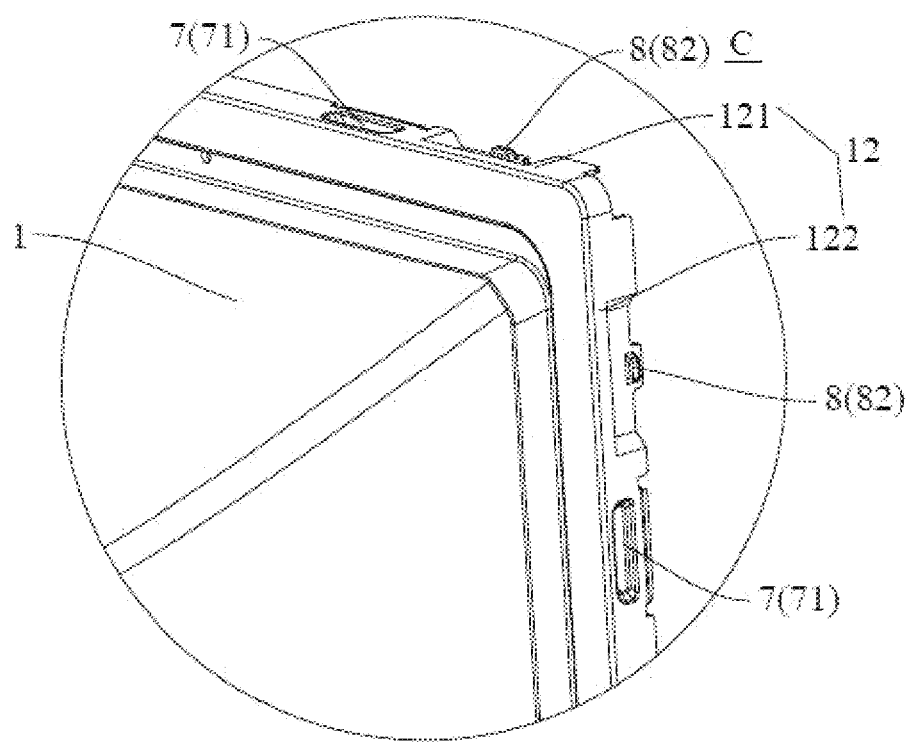
FIG. 6 is an enlarged view of part C in circle shown in FIG. 3.
Figure 9:
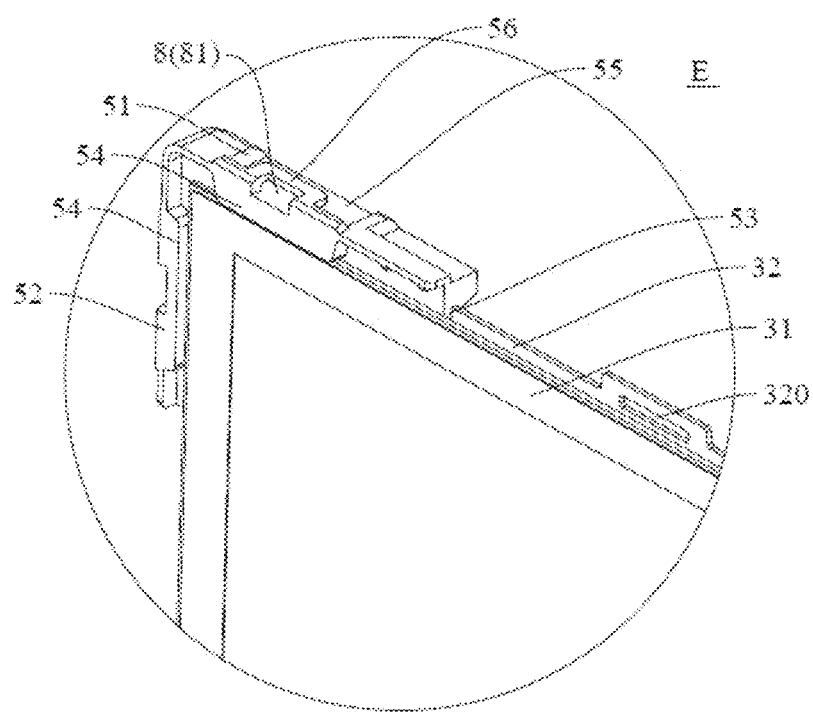
FIG. 9 is an enlarged view of part E in circle shown in FIG. 7.

In some embodiments of the present disclosure, as shown in FIGS. 4, 5 and 9, the membrane structure 3 may include an OC layer 31 and a membrane 32. The OC layer 31 may be arranged between the front housing 2 and the rubber block 5 and fitted on the rubber block 5. The membrane 32 may be arranged between the OC layer 31 and the back plate 1, and fitted on the front housing 2. In this regard, it is able to facilitate the installation of the membrane structure 3.

For example, in FIG. 9, the rubber block 5 may include a first stopper 53 and a second stopper 54. The first stopper 53 may be arranged at a rear side of the OC layer 31, so as to enable the OC layer 31 to be fitted on a front surface of the first stopper 53. The second stopper 54 may be arranged on the front surface of the first stopper 53 and protrude from the front surface of the first stopper 53 to form a step-like structure with the first stopper 53. The second stopper 54 may be arranged outside the OC layer 31 and abut against an outer edge of the OC layer 31, so as to stop the OC layer 31 to some extent, thereby to facilitate the assembling of the backlight module 100. The membrane 32 may be arranged at an inner side of the first stopper 53, and an outer edge of the membrane 32 may be provided with a plurality of installation members. An installation hole 320 may be formed in each installation member, and installation protrusions 211 may be placed on the front housing 2. The installation protrusion 211 may be clamped into the corresponding installation hole 320, so as to install the membrane 32.

As shown in FIG. 11, each installation protrusion 211 may be arranged at a rear side of the first body portion 21 of the front housing 2, and an avoidance member 41 may be placed on the light-shielding structure 4 to define an avoidance space. The installation protrusion 211 may be arranged at an opening of the avoidance space accordingly, and the installation member may be received in the avoidance space.

Figure 10:
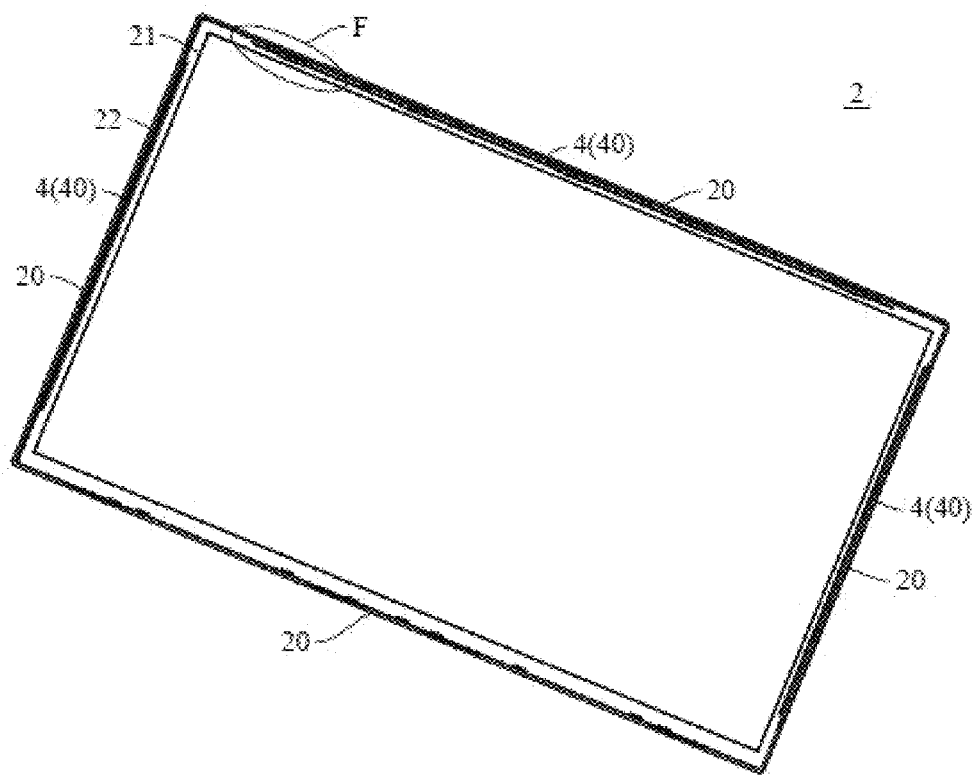
FIG. 10 is a schematic view showing a front housing in FIG. 1.

As shown in FIGS. 2 and 10, an outer contour of the front housing 2 may be of a quadrilateral shape, there may exist a plurality of light-shielding structures 4 arranged at an upper side, a left side and a right side of the front housing 2, and a back housing 6 may be arranged in back of the back plate 1 and at least shield a lower edge of the front housing 2. The rear housing 6 may shield the light emitted by the membrane structure 3 and passing through the gap between the front housing 2 and the back plate 1. In this regard, it is unnecessary to provide any light-shielding structure 4 at a lower side of the front housing 2, thereby to simplify the structure of the backlight module 100.

Of course, the plurality of light-shielding structures 4 may also be arranged at the upper side, the lower side, the left side and the right side of the front housing 2 respectively.

The present disclosure further provides in some embodiments a display panel, which includes the above-mentioned backlight module 100. The display panel may be applied to various TVs, which include, but not limited to, Liquid Crystal Display (LCD), Light-Emitting Diode (LED) display, Organic Light-Emitting Diode (OLED) display, Quantum-dot Liquid Crystal Display (QLED), and Active Matrix Organic Light-Emitting Diode (AMOLED) display.

According to the display panel in the embodiments of the present disclosure, through the above-mentioned backlight module 100, it is able to effectively prevent the occurrence of light leakage, thereby to improve the light utilization.

The other components of the display panel are known to a person skilled in the art, and thus will not be particularly defined herein.

The backlight module 100 in the embodiments of the present disclosure will be described hereinafter with reference to FIGS. 1 to 15. It should be appreciated that, the following description is for illustrative purposes only, but shall not be used to limit the present disclosure.

As shown in FIGS. 1-3, an outer contour of the backlight module 100 is approximately of a quadrilateral shape, and it may include the back plate 1, the front housing 2, the membrane structure 3 and the rubber block 5, without any middle frame.

The front housing 2 may be arranged in front of the back plate 1 and coupled to the back plate 1 through the first clamping assemblies 7. The plurality of first clamping assemblies 7 may be spaced apart from each other along the edge of the backlight module 100. The membrane structure 3 may be arranged between the back plate 1 and the front housing 2. The light-shielding structure 4 may be placed on the front housing 2, arranged outside the membrane structure 3, and extend backward to abut against the back plate 1. A plurality of abutting ribs 9 may be arranged outside the light-shielding structure 4, and an edge of the back plate 1 may be arranged between the abutting rib 9 and an edge of the front housing 2. There may exist four light-shielding structures 4 arranged at an upper side, a left side and a right side of the front housing 2 respectively. The light-shielding structure 4 at the upper side may be placed as the light-shielding rib 40 extending in a left-to-right direction, i.e., a horizontal direction, the light-shielding structure 4 at the left side may be placed as the light-shielding rib 40 extending in an up-to-down direction, i.e., a vertical direction, and the light-shielding structure 4 at the right side may be placed as the light-shielding rib 40 extending in the vertical direction.

Figure 14:
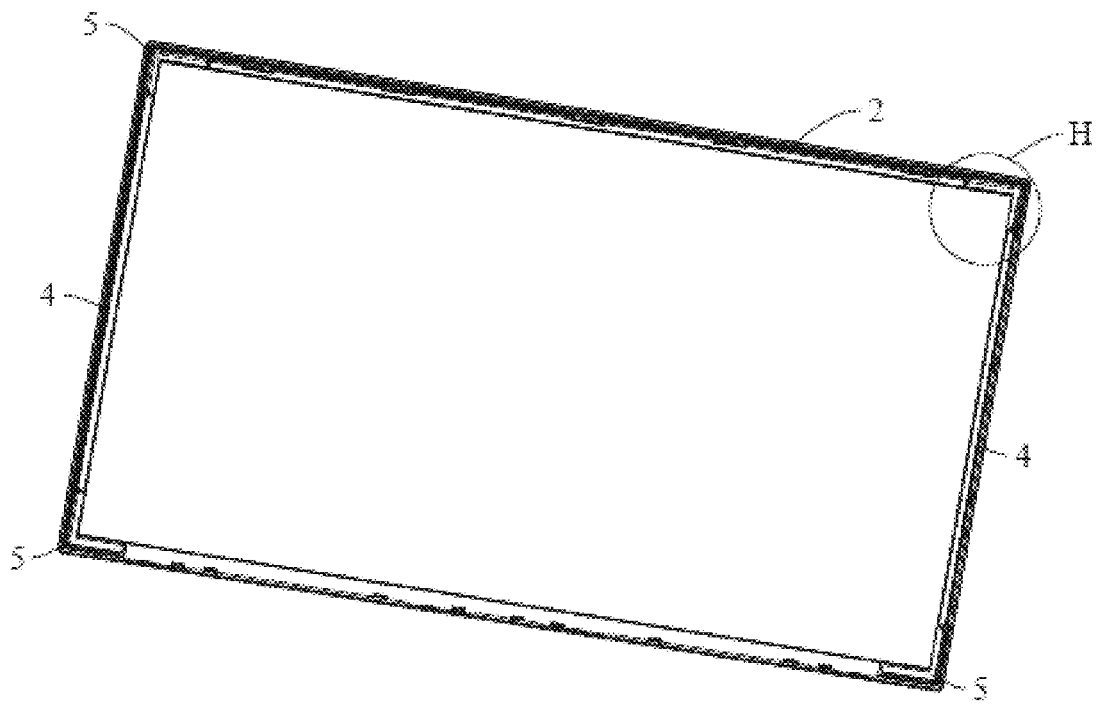
FIG. 14 is a schematic view showing the assembling of the front housing and the rubber block in FIG. 3.

As shown in FIG. 14, there may exist four rubber blocks 5 arranged between the back plate 1 and the front housing 2 and arranged outside the membrane structure 3. In addition, the four rubber blocks 5 may be arranged at four corners of the backlight module 100 respectively, each rubber block 5 may be coupled to the back plate 1 through the second clamping assembly 9, and each light-shielding structure 4 may be arranged between two adjacent rubber blocks 5.

According to the backlight module 100 in the embodiments of the present disclosure without any middle frame, it is able to shield all the light emitted by the membrane structure 3 toward the outside, thereby to prevent the occurrence of rearview light leakage for the entire backlight module 100, and prevent the light emitted by the membrane structure 3 from passing through the gap between the back plate 1 and the front housing 2.

In the above description, it should be appreciated that, such words as "central", "length", "on/above", "under/below", "front", "back", "left", "right", "vertical", "horizontal", "top", "bottom", "inside", "outside", "radial", "axial" and "circumferential" may be used to indicate directions or positions as viewed in the drawings, and they are merely used to facilitate the description in the present disclosure, rather than to indicate or imply that a device or member must be arranged or operated at a specific position.

In addition, such words as "first" and "second" are for illustrative purposes only, but shall not be used to implicitly or explicitly indicate any number or importance, i.e., they may be adopted to implicitly or explicitly indicate that there is at least one said feature. Further, such a phrase as "a plurality of" is used to indicate that there are at least two or more components, unless otherwise specified.

Unless otherwise specified, such words as "install", "connect", "couple" and "secure" may have a general meaning, e.g., the word "connect" may refer to fixed connection, removable connection or integral connection, or mechanical connection, electrical connection, communication connection, direct connection, or indirect connection via an intermediate component, or communication between two components, or wired or wireless communication connection. In addition, it may refer to internal communication between two components or an interactive relationship between the two components. The specific meanings of these words may be understood by a person skilled in the art according to the practical need.

Unless otherwise defined, when a first feature is arranged on or under a second feature, the first feature may be in contact with the second feature directly or via an intermediate medium. In addition, when the first feature is arranged on/above the second feature, the first feature may be arranged right on/above the second feature or not, or it merely means that the first feature is located at a level higher than the second feature. When the first feature is arranged under/below the second feature, the first feature may be arranged right under/below the second feature or not, or it merely means that the first feature is located at a level lower than the second feature.

In the above description, such phrases as "one embodiment", "some embodiments", "examples", "specific examples" or "some examples" intend to indicate that the features, structures, materials or characteristics are contained in at least one embodiment or example of the present disclosure, rather than referring to a same embodiment or example. In addition, the features, structures, materials or characteristics may be combined in any embodiment or embodiments in an appropriate manner. Furthermore, in the case of no conflict, the different embodiments or examples as well as the features in the embodiments or examples described in the specification may be combined.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A middle-frame-free backlight module, comprising:
   a back plate;
   a front housing arranged in front of the back plate and coupled to the back plate; and
   a membrane structure arranged between the back plate and the front housing, and the membrane structure being configured to emit light therefrom,
   wherein a light-shielding structure is arranged on one of the back plate and the front housing and abuts against the other one of the back plate and the front housing, and the light-shielding structure is arranged outside an edge of the membrane structure; or
   wherein two light-shielding structures are arranged on both the back plate and the front housing respectively and in corresponding and opposite positions, the light-shielding structure arranged on the back plate abuts against the light-shielding structure arranged on the front housing in the corresponding and opposite positions, and the two light-shielding structures are arranged outside an edge of the membrane structure; and
   wherein the light-shielding structure or the two light-shielding structures is(are) in form of one or more light-shielding ribs, the one or more light-shielding ribs are of a regular and elongated structure,
   in the case of a light-shielding structure being arranged on one of the back plate and the front housing, end portions of the one or more light-shielding ribs distal to the one of the back plate and the front housing abut against the other one of the back plate and the front housing, and the one or more light-shielding ribs are arranged outside edges of the membrane structure; or
   in the case of two light-shielding structures being arranged on both the back plate and the front housing respectively and in corresponding and opposite positions, end portions of the one or more light-shielding ribs distal to the one of the back plate and the front housing abut against end portions of the one or more light-shielding ribs distal to the other one of the back plate and the front housing, and the one or more light-shielding ribs are arranged outside edges of the membrane structure.

2. The middle-frame-free backlight module according to claim 1, wherein the light-shielding structure is arranged at a side of the front housing facing the back plate.

3. The middle-frame-free backlight module according to claim 1, wherein the light-shielding structure is arranged at a side of the back plate facing the front housing.

4. The middle-frame-free backlight module according to claim 1, wherein the two light-shielding structures are arranged a side of the front housing facing the back plate and a side of the back plate facing the front housing respectively.

5. The middle-frame-free backlight module according to claim 2, wherein the front housing comprises: a first body portion with an annular structure, the light-shielding structure being arranged at a side of the first body portion facing the back plate; and a first peripheral portion arranged at a side of the light-shielding structure distal to a central axis of the backlight module, wherein the first peripheral portion extends from an edge of the first body portion toward the back plate in a direction perpendicular to a surface of the front housing, and the first peripheral portion is coupled to the back plate through first clamping assemblies.

6. The middle-frame-free backlight module according to claim 5, wherein each first clamping assembly comprises: a slot formed in the back plate; and a buckle arranged at a side of the first peripheral portion proximate to the central axis and protruding from an inner surface of the first peripheral portion, wherein the buckle is clamped into the slot and abuts against an edge of the slot proximate to the front housing.

7. The middle-frame-free backlight module according to claim 5, wherein abutting ribs are arranged at a side of the light-shielding structure facing the first peripheral portion, the back plate comprises a second body portion and a second peripheral portion, the second body portion is arranged opposite to the first body portion in a front-to-rear direction, the second peripheral portion extends from an edge of the second body portion toward the front housing in the direction perpendicular to the surface of the front housing, and the second peripheral portion is arranged between each abutting rib and the first peripheral portion in such a manner that the second peripheral portion is coupled to the first peripheral portion through the first clamping assembly and abuts against the abutting rib.

8. The middle-frame-free backlight module according to claim 7, wherein the abutting ribs and the first clamping assemblies are arranged alternately in an extension direction of the light-shielding structure.

9. The middle-frame-free backlight module according to claim 1, wherein a rubber block is arranged between the back plate and the front housing, at a corner of the back plate and at a side of the membrane structure, and the rubber block is arranged in such a manner as to avoid the light-shielding structure.

10. The middle-frame-free backlight module according to claim 9, wherein the rubber block is coupled to the back plate through second clamping assemblies.

11. The middle-frame-free backlight module according to claim 10, wherein the rubber block comprises: a first connection member extending in a first edge of the back plate and coupled to the back plate through a corresponding second clamping assembly; and a second connection member extending in a second edge of the back plate and coupled to the back plate through a corresponding second clamping assembly, wherein the second edge is arranged adjacent to the first edge.

12. The middle-frame-free backlight module according to claim 9, wherein the membrane structure comprises: an over coating (OC) layer arranged between the front housing and the rubber block and fitted on the rubber block; and a membrane arranged between the OC layer and the back plate, and fitted on the front housing.

13. The middle-frame-free backlight module according to claim 1, wherein an outer contour of the front housing is of a quadrilateral shape, there is a plurality of light-shielding structures arranged at an upper side, a left side and a right side of the front housing respectively, and a back housing is arranged in back of the back plate and at least shields a lower edge of the front housing.

14. The middle-frame-free backlight module according to claim 1, wherein an outer contour of the front housing is of a quadrilateral shape, and there is a plurality of light-shielding structures arranged at an upper side, a lower side, a left side and a right side of the front housing respectively.

15. The middle-frame-free backlight module according to claim 1, wherein an edge of the front housing comprises four secondary edges, there are three light-shielding ribs corresponding to three of the four secondary edges respectively, and each light-shielding rib extends in an extension direction of the corresponding secondary edge.

16. The middle-frame-free backlight module according to claim 9, wherein the rubber block abuts against the back plate and the front housing respectively.

17. The middle-frame-free backlight module according to claim 1, wherein the light-shielding rib is provided with a uniform cross section in a rectangular shape.

18. A display panel, comprising the middle-frame-free backlight module according to claim 1.

* * * * *